United States Patent [19]

Nichols

[11] Patent Number: 4,905,963
[45] Date of Patent: Mar. 6, 1990

[54] VALVE ASSEMBLY FOR LIQUID CONTAINING TANKS
[75] Inventor: Dwight E. Nichols, Beatrice, Nebr.
[73] Assignee: Hoover Group, Inc., Roswell, Ga.
[21] Appl. No.: 264,057
[22] Filed: Oct. 28, 1988
[51] Int. Cl.$^4$ ............................................. F16K 51/00
[52] U.S. Cl. .................................... 251/144; 251/90; 251/346; 251/353
[58] Field of Search ............. 251/144, 353, 351, 343, 251/346, 252, 90, 92

[56] References Cited
U.S. PATENT DOCUMENTS

| | | | |
|---|---|---|---|
| 1,652,929 | 12/1927 | Cawood | 251/351 |
| 1,859,126 | 5/1932 | Boeuf | 251/353 |
| 3,684,240 | 8/1972 | Stehlin | 251/252 |
| 4,155,534 | 5/1979 | Hajek, II et al. | 251/353 |

Primary Examiner—A. Michael Chambers
Attorney, Agent, or Firm—Harness, Dickey & Pierce

[57] ABSTRACT

A discharge valve assembly for a liquid containing tank includes a hollow valve body having an outer tubular member and a concentrically spaced inner tubular member each being closed at one end by a generally disk shaped end portion. Both inner and outer members have radial apertures therethrough adjacent the closed end portion. A tubular gate member is guidably supported between the inner and outer members for axial and circumferentially movement between closed and open positions. A bung is engagable with the inner member and coacts with the tubular gate member when the gate member is in the fully closed position to lock the tubular gate member in the fully closed position.

14 Claims, 5 Drawing Sheets

VALVE ASSEMBLY FOR LIQUID CONTAINING TANKS

BACKGROUND AND SUMMARY OF THE INVENTION

This invention relates generally to large tanks for storing and transporting liquids in bulk and more particularly to a sliding gate valve for such a tank to facilitate discharge of the tank contents.

Portable tanks generally have a bottom discharge which is closed by a plug or a short section of piping having a conventional valve at the end of the section. Portable tanks are normally designed to maximize the usable volume within the tank. Accordingly, the less space that is required for discharge connection components such as a plug or valve assembly, the more volume that can be allocated for bulk storage.

Because of the desirability for a compact size in portable tank design, where space is at a premium, a compact tank discharge and valve fitting which allows complete discharge of the tank contents is desirable. In addition, such a discharge should be lockable to prevent accidental discharge of the tank contents.

Specifically in tanks designed for bulk liquid handling and storage, it is often desirable to have a discharge valve that is full ported to minimize restriction to flow through the discharge opening. Accordingly, a design which also breaks the formation of a vortex in the fluid during discharge is preferred. The valve must be capable of positive sealing to prevent leakage in both the open and closed valve positions as well as in an intermediate position. Finally, the discharge valve for a portable tank must be easy to operate.

It is therefore an object of the present invention to provide an compact discharge valve for a portable tank which occupies minimal space below the tank.

It is another object of the present invention to provide a sliding gate valve for a portable tank that is lockable in the closed position by insertion of a bung into the tank discharge opening.

It is still another object of the present invention to provide a sliding gate valve for a portable tank that can tolerate high fluid pressures and has a full ported opening to maximize the discharge flow rate from the tank.

It is still another object of the present invention to provide a gate valve assembly in which the fluid pressure on the gate is at right angles to the direction of movement of fluid discharging from the valve to thereby break the formation of a vortex in the fluid during discharge.

The valve assembly for a liquid containing tank according to the present invention includes a hollow valve body having an outer tubular member which is closed at one end by a disk shaped end portion. This outer member has at least one radial aperture through the member adjacent the closed end. Inside and concentric to the outer tabular member is an inner tubular member having one end attached to the end portion. This inner tubular member also has at least one aperture through the member thus forming a passage through the hollow valve body. Passage of liquid from the tank flows into the valve body through the apertures and out through the center of the inner tubular member.

The opening of the liquid containing tank is bounded by a threaded sleeve extending outward from the wall of the tank. The hollow valve body is positioned concentrically within the sleeve and is held in place by a threaded collar which is threadably engaged with the threaded sleeve. A flange on the threaded collar clamps the valve body in place.

Between the inner and outer tubular members of the hollow valve body is a movable tubular gate member. The tubular gate member can move axially and circumferentially of the body between a closed position fully inserted against the end portion, closing off the passage through the body, and an open position spaced from the end portion so as to open the passage through the body.

The valve assembly according to the present invention provides a full ported opening at the bottom of the tank enabling complete discharge of the tank contents. In addition, the design with a tubular gate member which closes off the passage in a guillotine fashion, means that fluid pressure works generally normal to the opening direction of the gate member. Therefore pressure from the tank contents against the tubular gate member is minimized enhancing the ease with which the valve can be operated.

The valve according to the present invention is fully ported which permits a large volume discharge rate. Such a large flow rate tends to form vortices in the throat of the discharge opening. However, the present invention minimizes the formation of vortices by changing the direction of and splitting the fluid entry into the discharge opening into several circumferential components.

The tubular valve according to the present invention utilizes elastic O-rings between the movable and stationary members to provide a fluid tight seal. In addition, a system of secondary seals using the threaded bung keeps fluid from leaking out when the valve is closed in the event of O-ring leakage.

Further objects, features and advantages of the invention will become evident from a consideration of the following description when taken in conjunction with the accompanying drawing and the appended claims.

DETAILED DESCRIPTION OF THE INVENTION

Figure 1:
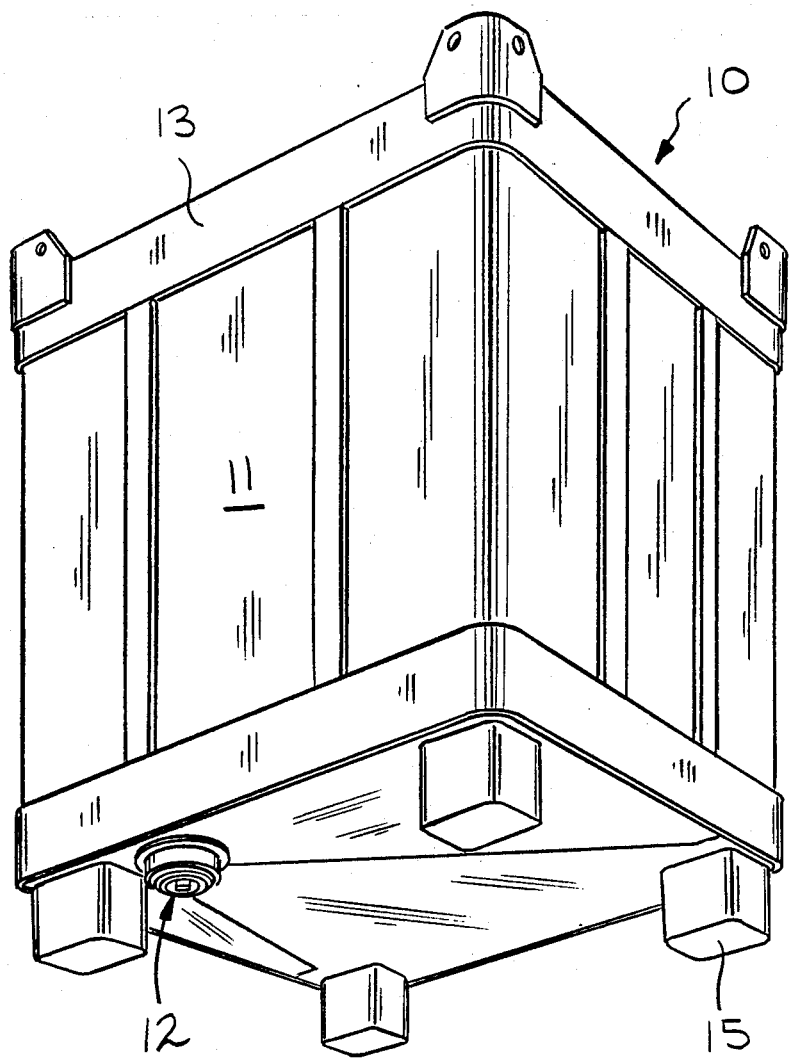
FIG. 1 is a perspective view of a portable tank having a valve according to the present invention disposed in the bottom of the tank.

With reference to the drawing, a portable tank 10 for bulk liquid storage and transport having a valve assembly 12 according to the present invention is shown in FIG. 1. The tank 10 is of the type having a large plastic container 11 mounted within a metal frame 13 having legs 15. A tank of this type is shown in U.S. Pat. No. 4,648,521 assigned to the assignee of this application.

The valve assembly 12 is a gate valve which comprises a hollow valve body 14 inserted in a discharge opening 16 in the bottom wall 18 of the tank 10. The hollow valve body 14 comprises an outer tubular member 20 having a disk shaped closed end portion 22 and a plurality of side wall openings or apertures 24. The apertures 24 are formed in the tubular member 20 adjacent the end portion 22 and are at a level of the bottom wall 18 of the tank 10 to assure complete tank drainage.

Concentric to and within the outer tubular member 20 is an inner tubular member 26 which is fixed to the end portion 22. Inner tubular member 26 has a plurality of apertures 28 in matched alignment with the apertures 24 through outer tubular member 20. Apertures 24 and 28 are separated by divider plate sections 30 and 32 in the inner and the outer tubular members 26 and 20, respectively. The plate sections 30 and 32 join the tubular members with the closed end portion 22.

The hollow body 14 is secured within the discharge opening 16 by a threaded collar 34 engaged with a threaded sleeve 36 which extends around the discharge opening 16 and extends downwardly from the tank bottom wall 18. Collar 34 engages a radial lip 38 on the outer tubular member 20 to retain the valve body 14 in the discharge opening 16. Disposed between the lip 38 and the sleeve 36 is an O-ring seal 40. The O-ring seal 40 maintains a liquid tight seal between the tank interior and the threaded collar 34, thus sealing the threads between the collar 34 and the sleeve 36 as well as sealing the space between the valve body 14 and the sleeve 36.

Figure 2:
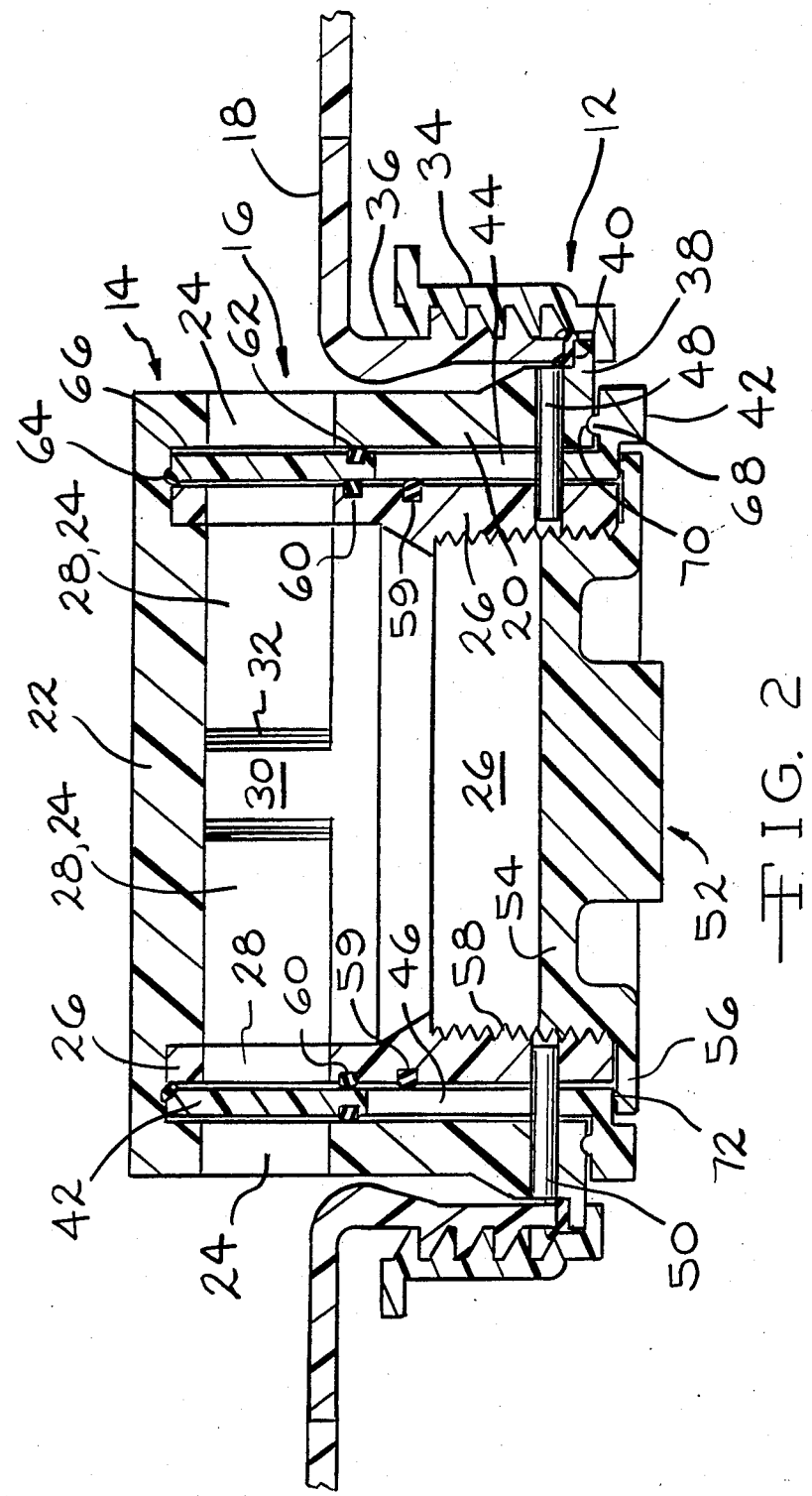
FIG. 2 is an enlarged sectional view of the valve shown in FIG. 1, with the valve gate closed and the bung installed.
Figures 3, 4:
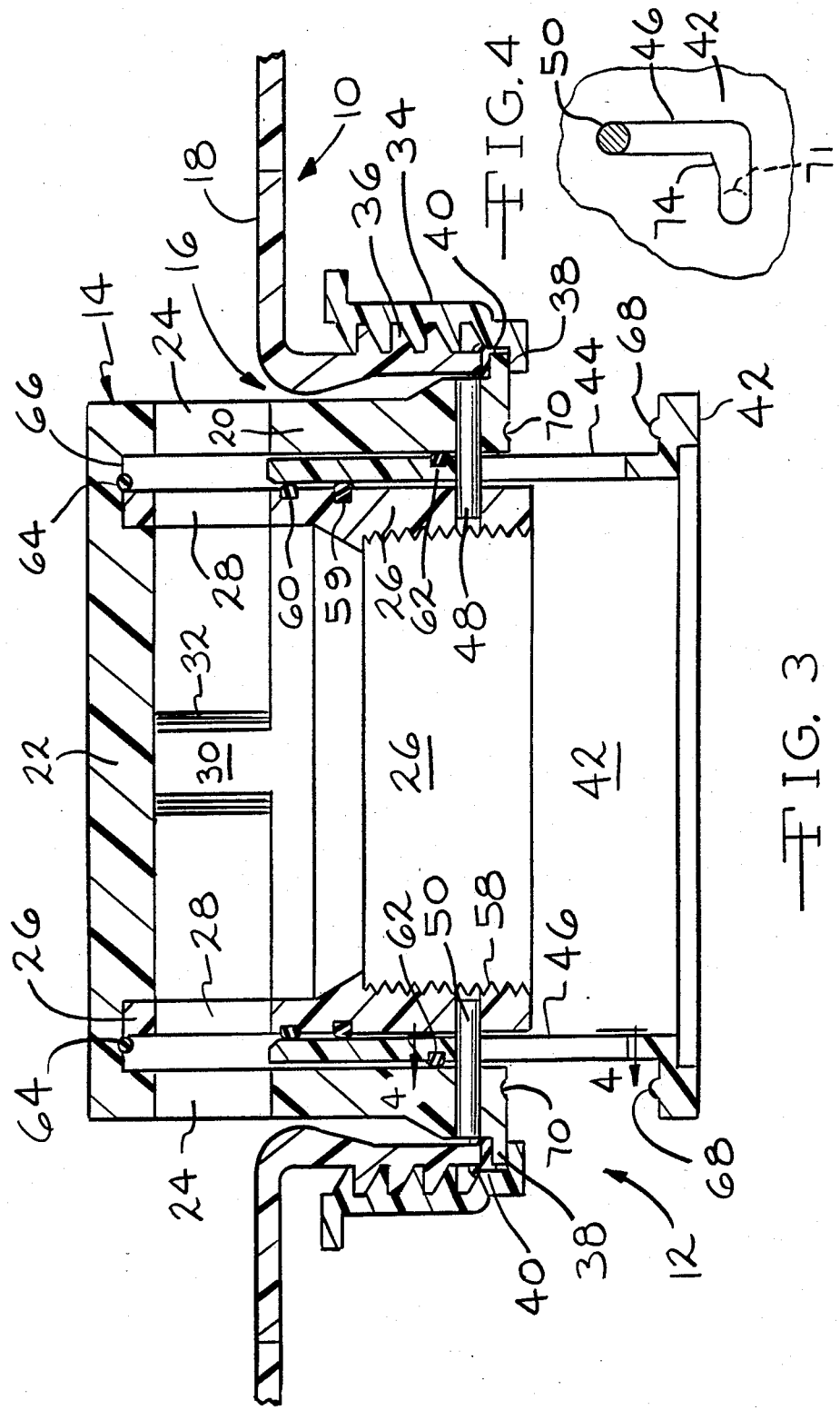
FIG. 3 is a sectional view of the valve according to the present invention shown in FIG. 2 illustrating the valve gate in the open position and the bung removed.
FIG. 4 is a fragmentary detail view of a portion of the valve assembly of this invention as seen from substantially the line 4—4 in FIG. 3.

A tubular gate member 42 is slidably disposed concentrically between the inner and the outer tubular members 26 and 20 respectively. The gate member 42 is movable between a fully inserted closed position, as shown in FIG. 2, and a fully withdrawn open position as shown in FIG. 3. The tubular gate member 42 has a pair of diametrically opposed L-shaped slots 44 and 46. Movement of the gate member 42 is guided and bounded by fixed pins 48 and 50 which pass through the slots 44 and 46 respectively and into the inner and outer tubular members 26 and 20 as shown in FIGS. 2 and 3. The general L-shape of the slots 44 and 46 is shown in FIG. 4.

As shown in FIG. 2, a bung 52 having a threaded portion 54 and a radial flange portion 56, is threadably engaged with threads 58 on the inside of the inner tubular member 26. The radial flange portion 56 engages the tubular gate member 42 locking the gate member 42 in the closed position. As can be seen in FIGS. 2 and 3, the bung 52 must be unscrewed and removed in order to move the tubular gate 42 from the fully inserted closed position to the fully withdrawn open position.

The valve body 14 may be formed in a single plastic molding or formed with the inner tubular member 26 as a separate part as shown in FIGS. 2 and 3. In this latter construction, the inner tubular member 26 is glued or otherwise bonded to the end portion 22.

The apertures 24 and 28 may be aligned radially, as shown in FIGS. 2 and 3, or may be off set to provide a tortuous path or passage through the valve to limit the rate of tank discharge. Alternatively, the size of apertures 24 and 28 my be varied to regulate the maximum flow rate. In the embodiment shown, the aperture size is maximized to provide a full ported design to minimize flow restriction.

Several O-rings provide a positive seal between the inner tubular member 26 and the tubular gate 42 and between the tubular gate 42 and the outer tubular member 20. O-rings 59 and 60 provide a double seal between the inner tubular member 26 and the tubular gate 42 in both the closed and the open positions as shown in FIGS. 2 and 3 respectively. A single O-ring seal 62 is provided between the outer tubular member 20 and tubular gate member 42. Finally, an O-ring seat 64 is positioned at the base of tubular gate member 42 within a circular channel 66 in the end portion 22. The O-ring seat 64 provides positive seating and sealing of discharge opening 16 when the tubular gate member 42 is fully inserted in the closed position.

A secondary seal is provided by the engagement of an annular rib 68 on tubular gate member 42 in an annular groove 70 in the flange portion 38 of the outer tubular member 20. The annular rib 68 is engaged with the groove 70 when the tubular gate member 42 is in the closed position 71 illustrated by the dashed lines in FIG. 4. The flange portion 56 of the bung 52 also has an annular ridge 72 which engages the annular end of the tubular gate 42 to secondarily seal the margin between the inner tubular member 26 and the tubular gate member 42. Engagement of the flange portion 56 of bung 52 with the tubular gate 42 locks the tubular gate member 42 in the closed position as well as further seating the rib 68 into the annular groove 70 effecting the secondary seal. Bung 52 also provides a secondary seal against leakage past O-ring seat 64 into inner tubular member 26.

The valve 12 is closed by fully inserting the tubular gate member 42 to the position shown in FIG. 2 and rotating the tubular gate member 42 clockwise until the pins 48 and 50 are in the dotted line position 71 shown in FIG. 4. This rotation locks the tubular gate member 42 into compressed engagement with the O-ring 64 to ensure full closure. The tapered inside edge 74, shown in FIG. 4, of each of the L-shaped slots 44 and 46 facilitates the gradual compression of the O-ring 64 as the tubular gate member 42 is rotated into the fully closed position. The bung 52 is then inserted and screwed into the open end of the inner tubular member 26 until the ridge 72 on the flange portion 56 engages the tubular gate member 42 further pressing the ridge 68 into sealing engagement with the groove 70 on the outer tubular member 20 as well as sealing between gate member 42 and inner tubular member 26.

The valve assembly 12 according to the present invention is opened by reversing the procedure just described. Bung 52 is first unscrewed from the inner tubular member 26. The valve 12 remains closed at this point. The tubular gate 42 is then rotated counterclockwise until the pins 48 and 50 are positioned in the axial portion of the slots 44 and 46 allowing axial movement of the gate member 42. As the gate member 42 is withdrawn, material is discharged through the discharge opening 16 via the apertures 24 and 28 in the valve body 14.

Prior to rotation of and withdrawal of the tubular gate member 42, an appropriately sized hose, tubing or pipe may be installed and threaded into the threads 58 inside the inner tubular member 26. Thus discharge from the tank 10 may be fully controlled and confined as may be required.

The installation of the valve body 14 into the sleeve 36 bounding the discharge opening 16 is but one way to install the valve assembly 12. The valve body 14 may be secured within a tank opening in any manner. For example, the valve body may be integrally molded into the tank wall thus eliminating the necessity for the collar 34 and sleeve 36. Alternatively, the valve body 14 could be made of metal and welded in place on a metal tank discharge.

As shown in FIGS. 2 and 3, apertures 24 and 28 may be located at or below the interior surface of the bottom wall portion 18. This ensures complete drainage of tank contents. Alternatively, apertures 24 and 28 may be positioned above the wall portion 18 to purposefully provide a residual level of fluid in the tank 10.

Figure 5:
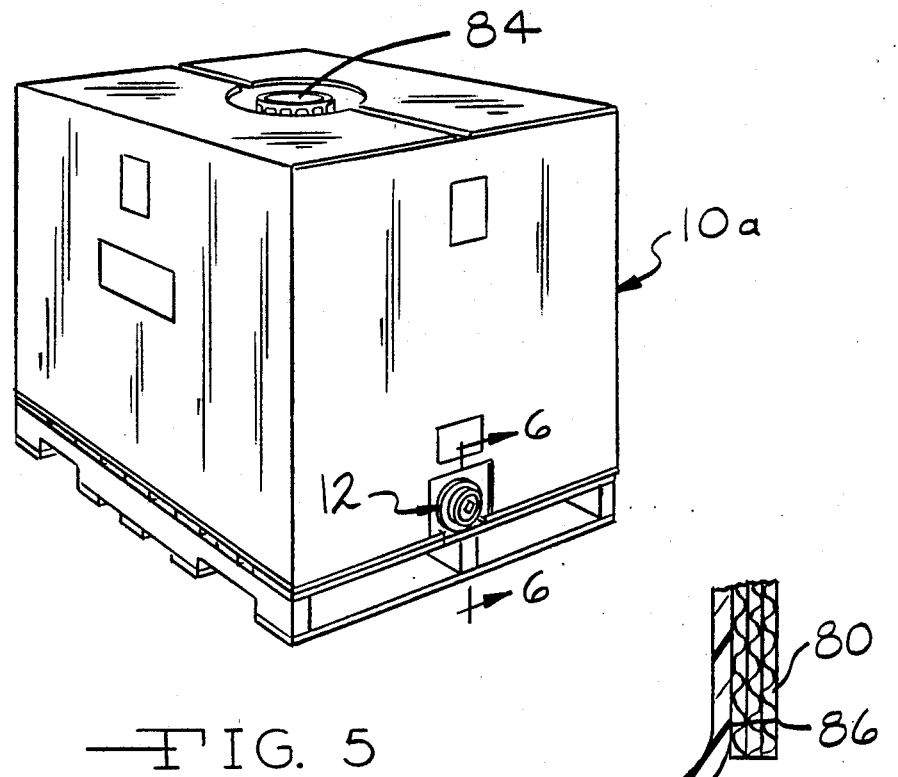
FIG. 5 is a perspective view of a side discharge tank provided with the improved valve assembly of this invention.
Figure 6:
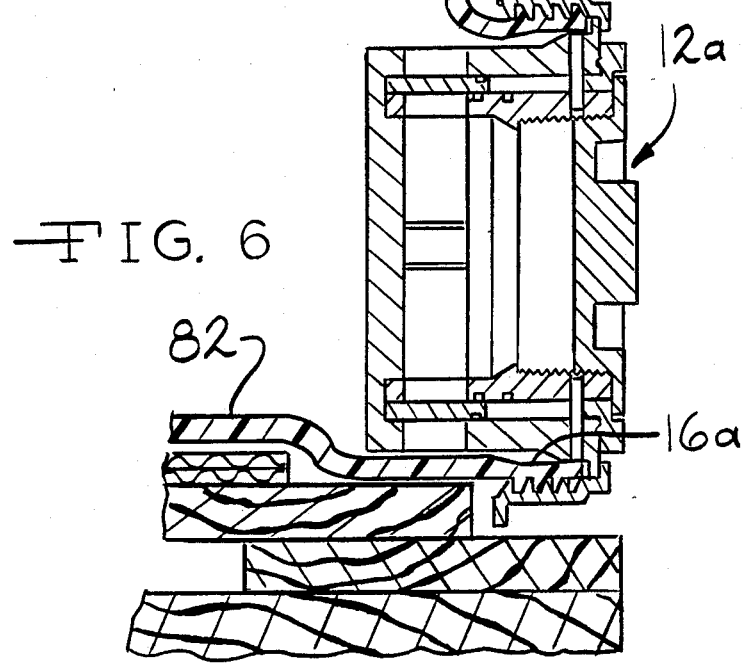
FIG. 6 is an enlarged sectional view of the valve shown in FIG. 5 taken along the line 6—6.

Other alternative embodiments are also within the scope of the present invention. For example, the valve assembly 12 above described is equally adaptable to be positioned at the lower side of a side discharge tank such as the tank 10a shown in FIGS. 5 and 6 which includes an outer casing 80 of cardboard or other suitable structural material and an inner plastic container 82 having a top inlet fitting 84. The valve assembly 12 in the tank 10a is inserted in a discharge opening 16a in the side wall 86 of the tank 10a. The valve 12 in the tank 10a is at right angles to the valve 12 in the tank 10.

Figure 7:
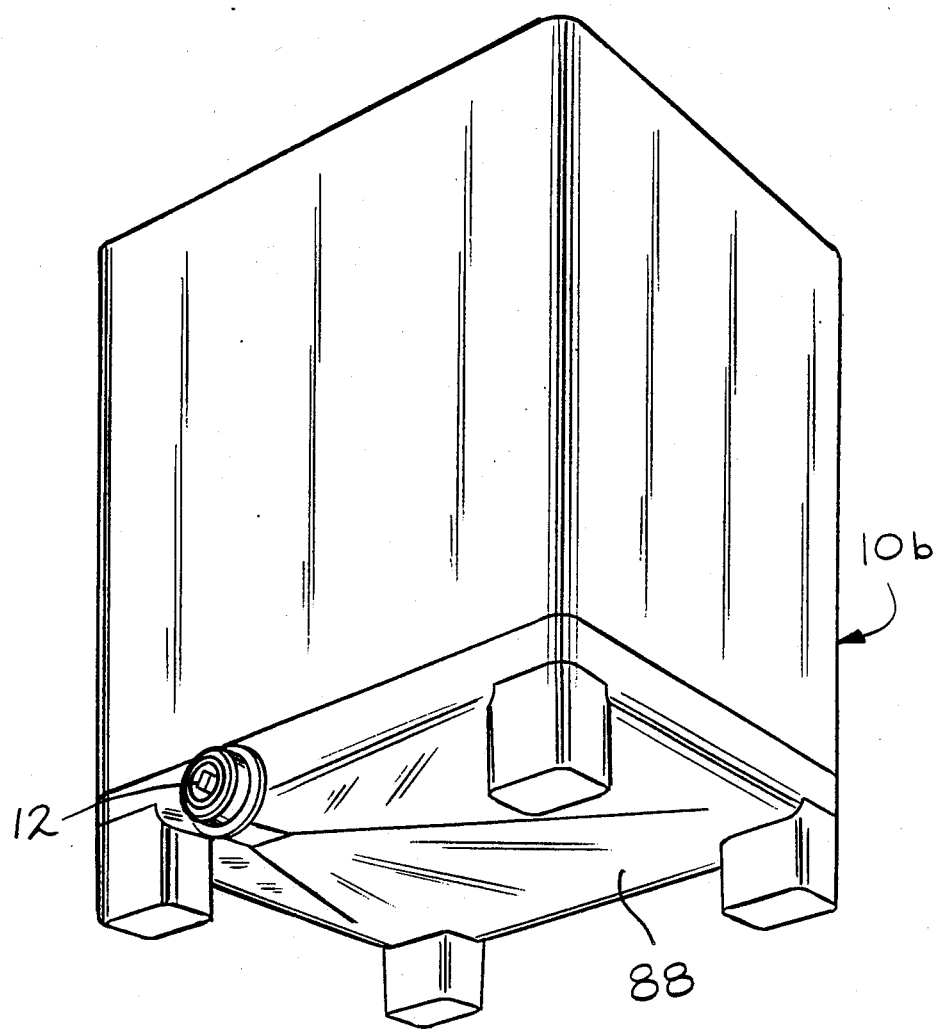
FIG. 7 is a perspective view of another side discharge tank provided with the valve assembly of this invention.

Another embodiment of the invention is shown in FIG. 7, namely, an all metal tank 10b with a top inlet (not shown) and a slope bottom 88 which directs all liquid in the tank 10b to a side discharge valve assembly 12. The valve assembly 12 is identical in all respects to the valve assembly 12 described above.

The sliding tubular gate valve according to the present invention provides a compact full flow tank discharge valve assembly that provides for complete drainage of the tank contents thus eliminating the potential for residual pockets of fluid liquid in the tank. The valve assembly 12 provides a large discharge port and does not project out from the side of the tank or hang down from the buttom of the tank and have to be supported. A valve which projects out from the tank wall creates a stress area that can cause a leak to develop in transit.

In addition, the valve assembly of the present invention provides a positive locking feature between the bung and tubular member to ensure that inadvertent bung removal with the valve open is prevented. It should also be appreciated that while the valve assembly 12 is illustrated in portable tank applications it has general use in other applications that employ linear flow. The availability of the valve 12 for both horizontal and vertical positions enhances its versatility.

The invention has been described above in an illustrative manner and it is to be understood that the terminology which has been used is intended to be in the nature of words of description rather then that of limitation. Obviously many modifications and variations of the valve assembly according to the present invention are possible in light of the above teachings. It is therefore to be understood that within the scope of the appended claims, the invention may be practiced otherwise than as specifically described.

What is claimed is:

1. A discharge valve assembly for a tank, said valve assembly comprising:

a hollow valve body having an outer tubular member and an inner tubular member substantially concentric with said outer member and spaced therefrom, said inner member and said outer member having at least one aperture therethrough forming a passage through said body;

a tubular gate member guidably supported between said inner and outer members for movement both axially and circumferentially of said body, said gate member being movable between a closed position closing off said passage through said body and an open position in which flow through said passage is substantially unobstructed, a substantially disk shaped end portion closing one end of said outer tubular member and one end of said inner tubular member; and said tubular gate member engaging said end portion in the closed position closing off said passage.

2. The discharge valve assembly according to claim 1 wherein said end portion has an annular channel therein for receiving said tubular gate member to close off said passage.

3. The valve assembly according to claim 2 further comprising:

a generally disk shaped bung member threadably engagable with the other end of said inner tubular member to removably close said other end;

means for locking said tubular gate member in the closed position; and means for retaining said tubular gate member in either the closed or the open positions.

4. The valve assembly according to claim 3 wherein said means for retaining comprises said gate member having at least one elongated slot therein; and at least one pin protruding from said body radially between said outer and said inner tubular members, said pin riding in said slot in said gate member limiting the axial and circumferential movement of said gate member, said pin and said slot coacting to retain said gate member in the closed position and preventing removal of said gate member from said body in the open position.

5. The valve assembly according to claim 4 wherein said bung is engagable with said inner tubular member and said gate member when said gate member is closed, said bung engaging said gate member to prevent movement of said gate member from the closed position whereby said bung must be removed to permit said gate to be moved from the closed position to the open position opening said passage.

6. The valve assembly according to claim 5 wherein said pin comprises an elongated cylindrical rod having one end embedded in said inner member and the other end embedded in said outer member, said pin passing through said slot through said gate member allowing movement of said gate member.

7. The valve assembly according to claim 1 wherein said tubular gate member has a circumferential outwardly open groove facing said outer tubular member of said body and an O-ring disposed in said groove, said O-ring being compressed between said tubular gate member and said body to maintain a seal between said body and said gate member during movement of said gate member between the closed and open positions.

8. The valve assembly according to claim 2 wherein the other end of said inner tubular member has internal threads and said bung further comprises a cylindrical threaded portion engagable with said threads on said inner member and a flange portion having a greater radius than said cylindrical portion for engaging said tubular gate member when said bung is threadably engaged with said inner tubular member of said body to prevent movement of said gate member from the closed position.

9. In a tank having a discharge opening, a gate valve comprising:
- a hollow valve body having an outer tabular member and an inner tubular member concentrically spaced within said outer member, each of said inner and outer tubular members having at least one aperture therethrough said apertures through said inner and outer members being in substantial radial alignment forming a passage for liquid to flow through said inner member;
- a tubular gate member disposed concentrically between said inner and outer members for movement both axially and circumferentially of said body between a closed position closing off said passage through said body and an open position spaced from said end portion so as to open said passage, said gate member having at least one elongated slot therein;
- at least one pin protruding from said body radially between said outer and said inner members, said pin riding in said slot in said gate member limiting the axial and circumferential movement of said gate member, said pin and said slot coacting to retain said gate member in said body when said gate member is in the open position; and
- a bung threadably engaged with said inner member so as to close said inner member to flow of liquid therethrough, said bung being engagable with said inner member and said gate member when said gate is fully inserted to the closed position to prevent movement of said gate member from the closed position, said bung engaging said gate member when said bung is threadable engaged with said inner member to lock said tubular gate member in the closed position closing off said passage.

10. The structure according to claim 9 wherein said tank has side walls and a bottom wall and a sleeve in one of said walls bounding said discharge opening and means mounting said body member on said sleeve.

11. The structure according to claim 10 wherein said discharge opening is in the bottom wall of said tank.

12. The structure according to claim 10 wherein said discharge opening is in a side wall of said tank.

13. The gate valve according to claim 10 further comprising an O-ring seal compressed between said body and said sleeve so as to provide for a sealed fit of said valve body in said sleeve.

14. A discharge valve assembly for a tank having a wall provided with a discharge opening bounded by an outwardly extending flange, said valve assembly comprising a hollow valve body mounted on said flange at a position projecting inwardly into said discharge opening;
- a hollow valve body having an outer tubular member and an inner tubular member substantially concentric with said outer member and spaced radially inwardly therefrom, wall means closing the inner ends of said tubular members and maintaining said members in fixed relative positions in said valve body, said inner and outer tubular members having radially extending apertures therethrough forming a passage through said body; and
- a tubular gate member guidably supported between said inner and outer members for movement both axially and circumferentially of said body, said gate member being movable between a closed position closing off said passage through said body and an open position in which flow through said passage is substantially unobstructed.

* * * * *